United States Patent [19]

Gaden

[11] Patent Number: 4,461,279

[45] Date of Patent: Jul. 24, 1984

[54] FRAME FOR ANGLED SOLAR PANELS

[76] Inventor: Richard E. Gaden, Rte. 2, Box 306, Cleveland, Okla. 74020

[21] Appl. No.: 323,247

[22] Filed: Nov. 20, 1981

[51] Int. Cl.³ ............................................. F24J 3/02
[52] U.S. Cl. .................................. 126/447; 126/450; 165/135
[58] Field of Search ............... 126/450, 438, 442, 443, 126/446, 447, 448, 449, 417; 165/67, 68, 135, 136

[56] References Cited

U.S. PATENT DOCUMENTS

| | | | |
|---|---|---|---|
| 3,314,415 | 4/1967 | Rowekamp | 126/450 |
| 4,051,832 | 10/1977 | Stelzer | 126/450 |
| 4,112,919 | 9/1978 | Davis | 126/450 |
| 4,127,103 | 11/1978 | Klank | 126/450 |
| 4,127,104 | 11/1978 | Greene | 126/450 |
| 4,137,901 | 2/1979 | Maier | 126/450 |
| 4,158,357 | 6/1979 | Allegro | 126/450 |
| 4,186,722 | 2/1980 | Muessig | 126/428 |
| 4,258,697 | 3/1981 | Flagg | 126/438 |
| 4,291,673 | 9/1981 | Deutz | 126/450 |
| 4,306,544 | 12/1981 | Clemens | 126/438 |
| 4,324,226 | 4/1982 | Beck | 126/450 |
| 4,378,006 | 3/1983 | Hawley | 126/417 |

Primary Examiner—Daniel J. O'Connor
Attorney, Agent, or Firm—William S. Dorman

[57] ABSTRACT

A frame for an angled solar panel comprising a rear vertical wall connected along a lower edge to a horizontal bottom wall, the rear vertical wall having its upper portion bent along a substantially horizontal bend line to form a downwardly and forwardly projecting upper edge, the bottom wall having a outer portion spaced from its line of connection with the vertical wall and being bent along a horizontal line to form an upwardly and rearwardly projecting outer edge, the upper and outer projecting edges being bent so as to lie substantially in the same inclined plane.

3 Claims, 5 Drawing Figures

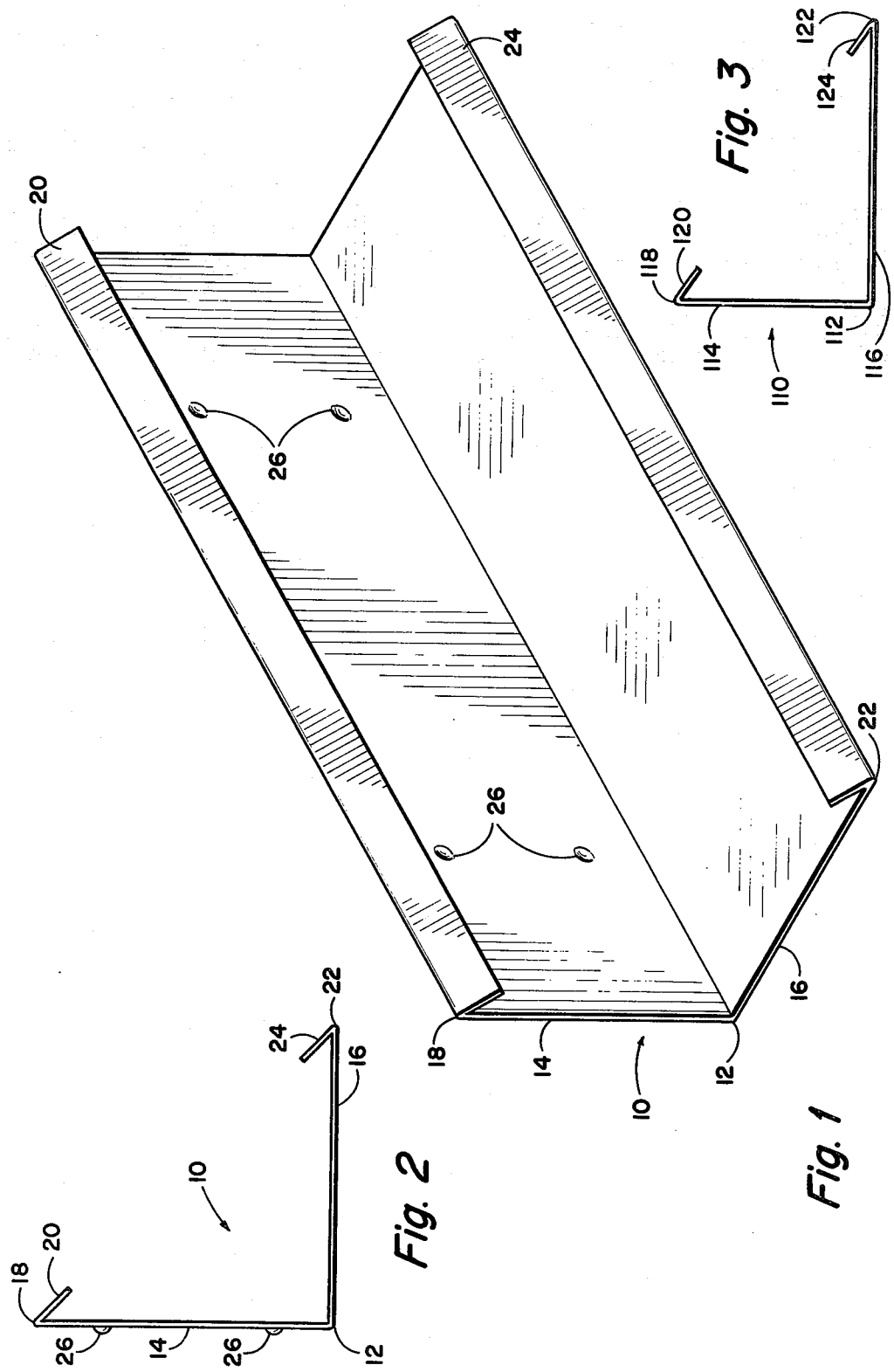

FRAME FOR ANGLED SOLAR PANELS

BACKGROUND OF THE INVENTION

1. Field of the Invention

The present invention relates to an angled solar panel and, more particularly, to a frame for an angled solar panel which can be simply constructed from a single sheet of material.

2. Prior Art

In the past, most solar panels which are used commercially have been in the form of elongated rectangular members which can lie flat on an inclined roof, but, when placed on a flat surface, must be supported on some type of supporting structure which will dispose the panel at the proper angle to best receive the rays of the sun. Even on inclined roofs, some type of bracket is generally required for attaching or holding the panels in place.

Angled solar panels or heaters are known in the art. For example, U.S. Pat. No. 4,127,104, issued to Michael E. Greene, shows a solar heater for water or the like where the cross-sectional shape of the heater is triangular. Deutz, U.S. Pat. No. 4,291,673, shows a solar panel which has triangular cross-section. Allegro, U.S. Pat. No. 4,158,357, shows solar sections which are triangular in cross-section.

SUMMARY OF THE INVENTION

The present invention relates to a solar panel which can be employed on a flat surface but which will be pre-designed to present the absorptive portion at the correct angle with respect to the sun without requiring any clumsy or expensive supports. More precisely, the present invention pertains to a frame for the above-described angled solar panel, this frame being bent from a single sheet of galvanized metal, for example.

The frame of the present invention, therefore, can be bent from a single sheet of metal, preferably galvanized iron or tin, in the form of a flat rectangular metal sheet. The frame, thus, has a central bend which is the line of juncture between a back vertical wall and a bottom horizontal wall. The upper end of the vertical wall is bent to form a downwardly and forwardly projecting upper edge whose angle of downward inclination essentially represents the hypotenuse of a triangle of which walls represent the sides. Similarly, the bottom horizontal wall is bent to form an upwardly and rearwardly projecting outer edge which, if extended upwardly, would essentially coincide with the downwardly bent upper edge.

Another feature of the frame involves a plurality of dimples which are located along the back vertical wall, for example. These dimples are merely formed by pressing into the surface of the vertical wall in any well known manner. The purpose of the dimples is to separate the frame slightly from the surface against which the frame rests. If the frame were supported from a vertical surface, then the dimples would be in the vertical wall; if it were desired to have the frame rest upon a horizontal surface, then the dimples would be in the bottom horizontal wall.

BRIEF DESCRIPTION OF THE DRAWINGS

FIG. 1 is a perspective view of a frame for use in constructing an angled solar panel;

FIG. 2 is a left hand end view of the frame shown in FIG. 1;

FIG. 3 is a view similar to FIG. 2, showing an alternate embodiment of the frame;

DETAILED DESCRIPTION OF THE PREFERRED EMBODIMENTS

Figure 4:
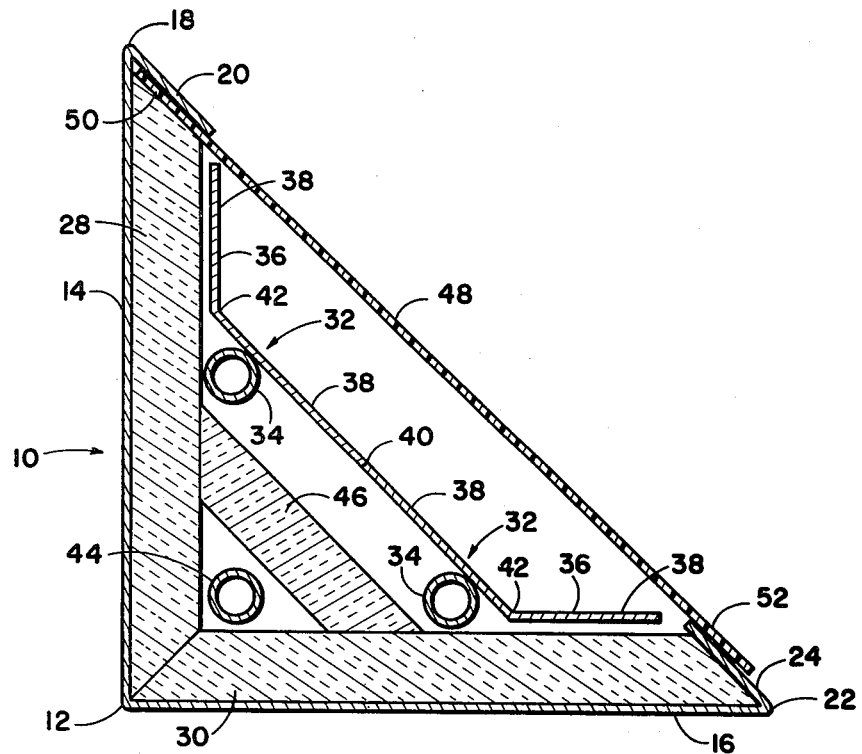
FIG. 4 is a cross-sectional view through a solar panel employing the frame shown in FIGS. 1 and 2.

Referring to the drawings in detail, FIGS. 1 and 2 show a frame 10 which can be bent from a single sheet of metal, preferably galvanized iron or tin. The form of the sheet or blank from which the frame 10 is bent, is not shown, but it should be understood that this would simply be a flat rectangular metal sheet. The frame 10, therefore, has a central bend or crease 12 which is the line of juncture or bend between a back vertical wall 14 and a bottom horizontal wall 16. The upper end of the vertical wall 14 is bent at 18 to form a downwardly directed or extending upper edge or lip 20 whose angle of downward inclination essentially represents the hypotenuse of a triangle of which walls 14 and 16 represent the sides. Similarly, the bottom horizontal wall 16 is bent at 22 to form an upwardly angled outer edge or lip 24 which, if extended upwardly, would essentially coincide with the downwardly bent edge 20. Stated somewhat differently, and from a more precise geometrical viewpoint, the bent-over upper edge 20 and the bent-over lower edge 24 lie essentially in the same inclined plane.

The only remaining feature of the frame 10 per se involves a plurality of dimples 26 which, in the case of the embodiments shown in FIGS. 1 and 2 are located along the back vertical wall 14. These dimples 26 are merely formed by pressing into the surface of the vertical wall 14 in any well known manner. The purpose of the dimples 26 is to separate the frame slightly from the surface or object against or upon which the frame rests or to which the frame is attached. If the frame 10, for example, were supported from a vertical surface, then the dimples 26 would be in the vertical wall 14 as shown. If it were desired to have the frame 10 rest upon a horizontal surface, then the dimples 26 would be in the bottom horizontal wall 16. Of course, if the width of the walls 14 and 16 were equal (as they are shown in FIGS. 1 and 2), such that edges 20 and 24 would be at a 45° angle with respect to the sides 14 and 16, respectively, then the frame 10 could simply be turned so that the wall 14 was resting against the horizontal surface, if it was desired to support the frame in that fashion.

FIG. 3 represents a modification of the frame 10 shown in FIGS. 1 and 2. Here in FIG. 3, a frame 110 is formed from a vertical wall 114 and a horizontal wall 116, which are connected together along a line of bend 112; the upper outer portion of the vertical wall 114 is bent at 118 to form a downwardly inclined upper edge 120, whereas the outer portion of the flat horizontal wall 116 is bent at 122 to form an upwardly inclined outer edge 124. If the edges 120 and 124 were extended towards each other, they would essentially merge to form the hypotenuse of the triangle represented by the frame shown in FIG. 3. The purpose of the illustration is to show that the height of the vertical wall 114 does not necessarily have to be the same as the width of the horizontal bottom wall 116; in a situation where it is desired to have the hypotenuse of the frame at an angle less than 45° (with respect to the horizontal) then the arrangement of FIG. 3 will be the desired arrangement. Although not shown in FIG. 3, dimples such as the dimples 26 would be in the wall 114 if the frame of FIG. 3 were to be supported from a vertical surface, or in the lower horizontal wall 116 if the frame of FIG. 3 were to be supported on a horizontal surface.

Figure 5:
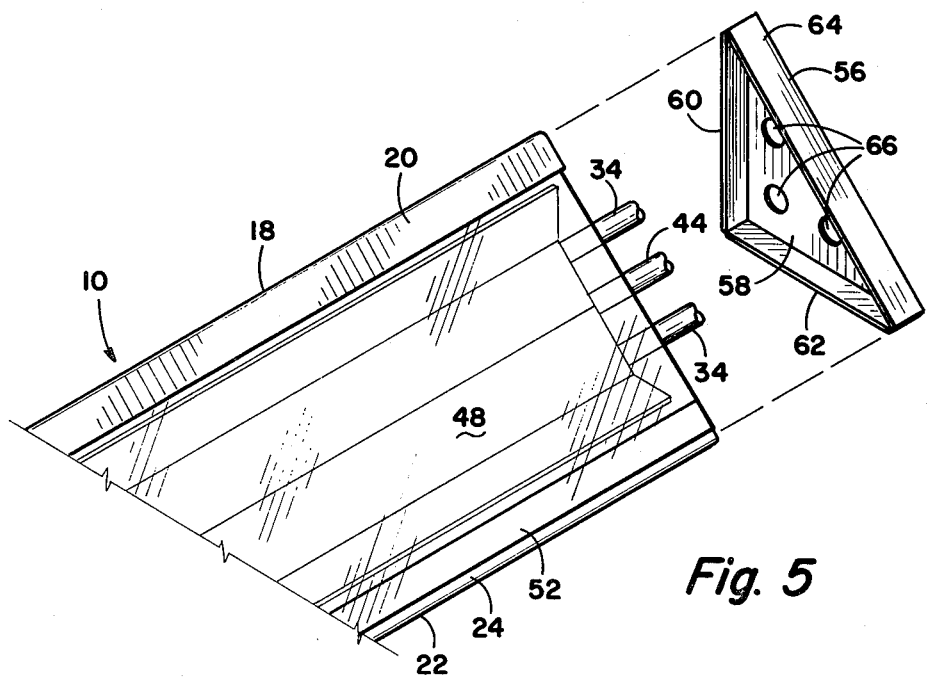
FIG. 5 is a fragmentary perspective and telescopic view of the solar panel shown in FIG. 4 and showing an end cap for closing over the end of the solar panel.

Turning now to a consideration of FIGS. 4 and 5, these figures represent a typical or preferred solar panel made from the frame shown in FIGS. 1 and 2. Referring more specifically to FIG. 4, the frame 10 is provided with a vertical sheet or strip of insulation 28 which extends from the bottom of the interior of the frame 10 and upwardly almost to the bent down edge 20 but leaving a slight space for the introduction of a sheet of translucent material as will be described hereinafter. The frame 10 is also provided with a horizontal strip or sheet of insulation 30 which is the same as the insulation material 28 and which extends from the lower end of the strip of insulation 28 along the bottom wall 16 to the angled edge 24. Within the interior triangular space of the frame 10 shown in FIG. 4 there are mounted a pair of solar absorpters 32 arranged in side by side relation. Each solar absorpter 32 is formed by a tube 34 and fin 36 which is attached to the tube and which extends on opposite sides of the tube to form wings 38. The fins of the two absorpters abut against each other at the location or joint 40 and, if desired, they can be welded or otherwise attached to each other along this joint 40. The fins 36 are bent at 42 such that the upper portion of the upper fin 36 is essentially vertical and is spaced parallel with respect to the sheet of insulation 28; similarly, the lower portion of the fin 36 of the lower solar absorpter 32 is bent such that its lowermost portion is essentially horizontal and is spaced parallel to the sheet of insulation 30. The fins 36 and the tubes 34 (if desired) are preferably coated with some type of coating or paint which is absorptive with respect to the rays of the sun. Some type of heating medium, such as water, passes through the tubes 34 for the full length of the solar panel formed by the structure shown in FIGS. 4 and 5, and a third pipe or tube 44 located near the internal apex of the triangle connects with the two tubes 34 and serves as the return for the fluid which is heated in the tubes 34. Of course, the tube 44 could serve as the supply if desired. An angled block of insulation 46 is disposed as shown in FIG. 4 and connects with the block of insulation 28 and the block of insulation 30 between the two pipes 34 and the pipe 44.

To cover over the open triangular space, a sheet of fiberglass 48 or other suitable transparent or translucent material is connected to the frame by inserting the upper edge 50 of this fiberglass sheet 48 underneath the upper edge or lip 20 between the lip 20 and insulation 28. Preferably a continuous bead of putty or other adhesive material (not shown) is applied to the upper edge of the fiberglass sheet 48 to effect a good seal between the upper edge of the sheet 48 and the lip 20. As shown in FIG. 4, the lower edge 52 of the fiberglass sheet 48 overlies the bent edge 24. An effective seal between the lower edge 52 and the bent edge 24 can be achieved by placing a continuous bead of putty or adhesive material (not shown) along the outer upper surface of the edge 24 or along the inner lower surface of the edge 52. By having the fiberglass sheet overlie the bent portion 24 at its lower edge 52, a weather sealing problem is obviated which might otherwise occur if one were to attempt to insert the lower edge 52 beneath the bent over edge 24.

For the purpose of covering over the ends of the panel shown in FIGS. 4 and 5, an end cap 56 is provided. This end cap consists of a vertical triangular plate 58, a vertical back strip 60 which is attached at right angles to the face 58, a horizontal bottom strip 62 which connects at right angles to the plate 58 and to the strip 60, and an angled strip 64 which connects at right angles to the surface 58 and which connects at its upper and lower ends with the upper and outer ends, respectively, of the strips 60 and 62. This end cap 56 is adapted to be inserted into the end of the solar panel shown in FIG. 5. Since the upper end of the inclined strip 64 must underlie the outer upper edge 50 of the fiberglass sheet 48, the strip 60 is somewhat shorter in vertical dimension than the strip 62 is in horizontal dimension, assuming that the solar panel shown in FIGS. 4 and 5 is designed for a 45° presentation to the solar rays. The end cap 56 is provided with three holes 66 through which the two pipes 34 and the return pipe 44 are adapted to pass. Actually, the end cap 56 is shown with three holes for the sake of simplicity. In actuality, it is preferred that the two ends of the pipes 34 be joined together at the end of each solar unit (and within the confines of that solar unit) so that a single pipe (for medium to be heated) would pass through the end cap 56. Under this arrangement, only two holes 66 would be in the end cap 56. However, for simplicity, the ends of the two tubes 34 are not shown as joined.

Obviously, the design of the frame 10 shown in FIGS. 1 and 2 permits a modular construction of the solar panels which are shown in FIGS. 4 and 5. That is, the frames 10 can be provided in uniform lengths; and the internal components such as the insulation strips, the solar absorpters 32 (with the ends of the tubes preferably connected together to join with a single supply pipe or tube as indicated above) and the remaining components can be provided in uniform lengths and widths so that panels such as shown in FIGS. 4 and 5 can be connected together in end to end relation. It is possible, but not preferable, that the end of one solar unit can be telescoped into another. Preferably, a strip of sheet material (not shown) and preferably somewhat wider than the width of the end cap 56 can be inserted underneath the edges 20 of the frames of abutting solar panels and wrapped aroung the frames of these abutting panels and stapled thereto. The pipes of the abutting solar absorpters and return pipes would be welded together prior to the application of this attachment strip.

Whereas the present invention has been described in particular relation to the drawings attached hereto, it should be understood that other and further modifications, apart from those shown or suggested herein, may be made with the spirit and scope of this invention.

What is claimed is:

1. A frame for an angled solar panel comprising a rear vertical wall connected along a lower edge to a horizontal bottom wall, the rear vertical wall having its upper portion bent along a substantially horizontal bend line to form a downwardly and forwardly projecting upper edge, the bottom wall having a outer portion spaced from its line of connection with the vertical wall being bent along a horizontal line to form an upwardly and rearwardly projecting outer edge, the upper and outer projecting edges being bent so as to lie substantially in the same inclined plane, a plurality of dimples projecting outwardly from one of said walls so as to space said wall from a surface against which the frame is to be supported, a first vertical sheet of insulation within the frame extending along the rear vertical wall from the bottom of the frame to said upper edge, a second sheet of insulation extending horizontally along the bottom wall from the first sheet of insulation to said outer edge, a solar absorber mounted within the free triangular area, a sheet of translucent material covering over the hypotenuse of the frame, the upper edge of said sheet of translucent material being inserted between said upper edge and the upper end of the first sheet of insulation and the lower end of the translucent sheet overlying said outer edge, an insulation block angled between the first and second sheets of insulation inwardly of the solar absorber, a pair of spaced horizontal tubes connected to the absorber and located between the absorber and the angled block of insulation, and a third horizontal tube located on the opposite side of the angled block of insulation from the pair of horizontal tubes and connected to the pair of horizontal tubes.

2. A frame as set forth in claim 1 wherein the height of the vertical wall is substantially equal to the width of the horizontal wall.

3. A frame as set forth in claim 1 wherein the height of the vertical wall is less than the width of the horizontal wall.

* * * * *